United States Patent
Wittberg et al.

(10) Patent No.: US 9,565,631 B2
(45) Date of Patent: Feb. 7, 2017

(54) METHOD AND ARRANGEMENT FOR CONTROLLING DISCONTINUOUS RECEPTION BY A USER EQUIPMENT

(71) Applicant: Telefonaktiebolaget L M Ericsson (publ), Stockholm (SE)

(72) Inventors: Mikael Wittberg, Uppsala (SE); Walter Müller, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 460 days.

(21) Appl. No.: 14/234,217

(22) PCT Filed: Nov. 11, 2013

(86) PCT No.: PCT/SE2013/051326
§ 371 (c)(1),
(2) Date: Jan. 22, 2014

(87) PCT Pub. No.: WO2014/112918
PCT Pub. Date: Jul. 24, 2014

(65) Prior Publication Data
US 2014/0204820 A1 Jul. 24, 2014

Related U.S. Application Data

(60) Provisional application No. 61/754,317, filed on Jan. 18, 2013.

(51) Int. Cl.
*H04L 12/28* (2006.01)
*H04W 52/02* (2009.01)
*H04W 76/04* (2009.01)
*H04M 1/27* (2006.01)
*H04J 1/16* (2006.01)

(52) U.S. Cl.
CPC ......... *H04W 52/0216* (2013.01); *H04M 1/271* (2013.01); *H04W 76/048* (2013.01)

(58) Field of Classification Search
USPC ................................ 370/252, 230, 278, 386
See application file for complete search history.

(56) References Cited

U.S. PATENT DOCUMENTS

| 2008/0232310 | A1 | 9/2008 | Xu | |
| 2009/0232054 | A1* | 9/2009 | Wang | H04W 52/0225 370/328 |
| 2009/0238098 | A1 | 9/2009 | Cai et al. | |
| 2010/0272004 | A1* | 10/2010 | Maeda | H04L 5/0007 370/312 |

(Continued)

FOREIGN PATENT DOCUMENTS

| EP | 2144452 A1 | 1/2010 |
| EP | 2182765 A2 | 5/2010 |

*Primary Examiner* — John Pezzlo
(74) *Attorney, Agent, or Firm* — Coats & Bennett, P.L.L.C.

(57) ABSTRACT

The present disclosure relates to a method in a network node for controlling DRX to be applied by a user equipment, UE, connected to said network node. Said network node can order the UE to enter a first DRX cycle by means of a specific control element. The method comprises the step of ordering the user equipment to enter a second DRX cycle by means of a modified usage of said specific control element. The disclosure furthermore relates to a network node, a method in a user equipment and a user equipment.

22 Claims, 5 Drawing Sheets

(56) References Cited

U.S. PATENT DOCUMENTS

| | | | |
|---|---|---|---|
| 2011/0199984 A1* | 8/2011 | Umesh | H04L 1/1829 370/329 |
| 2011/0292851 A1* | 12/2011 | Fong | H04L 5/001 370/311 |
| 2012/0069782 A1 | 3/2012 | Kuo et al. | |
| 2012/0120828 A1 | 5/2012 | Anderson et al. | |
| 2014/0286240 A1* | 9/2014 | Kim | H04W 56/0005 370/328 |

* cited by examiner

DRX Command MAC Control Element Sub Header

METHOD AND ARRANGEMENT FOR CONTROLLING DISCONTINUOUS RECEPTION BY A USER EQUIPMENT

FIELD OF THE INVENTION

The present invention relates to Discontinuous Reception, DRX.

BACKGROUND

In a typical radio communications network, wireless terminals, also known as mobile stations and/or user equipments, UEs, communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station at a base station site or an antenna site in case the antenna and the radio base station are not collocated. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g., eNodeBs in LTE, and the core network. As such, the radio access network (RAN) of an EPS system has an essentially "flat" architecture comprising radio base station nodes without reporting to RNCs.

It should be understood that "user equipment" is a non-limiting term which means any wireless terminal, Machine Type Communication (MTC) device or node e.g. Personal Digital Assistant (PDA), laptop, mobile, sensor, relay, mobile tablet or even a small base station communicating within respective cell.

The Radio Resource Control protocol, RRC, see 3GPP TS 36.331, is a signaling protocol for configuring, re-configuring and general connection handling in the LTE radio access network (E-UTRAN). RRC controls many functions such as connection setup, mobility, measurements, radio link failure and connection recovery. A UE in LTE can be in two RRC states: RRC_CONNECTED and RRC_IDLE. In RRC_CONNECTED, there is an RRC context established, that is, the parameters necessary for communication between a UE and the network are known to both entities.

Packet data traffic is often bursty, with occasional periods of transmission activity followed by periods of silence. To reduce the terminal power consumption, LTE has introduced a mechanism for continuous reception, DRX, which means that the UE monitors downlink control signaling transmitted in a Physical Downlink Control Channel, PDCCH, in only one subframe per DRX cycle, where a DRX cycle is defined as the duration of one ON-time period plus one OFF-time period. During remaining subframes of the DRX cycle, the UE has its receiver circuitry switched off.

Thus, the DRX mechanism is based on periods of activity, called OnDuration, where the UE must be awake and monitor the PDCCH. The onDuration time period is followed by a possible period of inactivity, called "Possible DRX" in FIG. 1. These DRX cycles can either be long or short DRX cycles as illustrated in FIG. 1. The RRC protocol activates the DRX mechanism of a given UE and defines the periods when the UE is in Active Time.

DRX in the RRC_CONNECTED state is described in section 5.7 of the 3GPP LTE MAC specification 3GPP TS 36.321. The purpose with DRX is to allow the UE some sleep time when it does not have to monitor the PDCCH channel for new transmissions. The time when the UE has to listen on the PDCCH channel is called Active Time, and when UE is not in Active Time it does not have to monitor the PDCCH channel. What is included in Active Time is defined in TS 36.321, section 5.7.

There are also DRX related timers and DRX related rules that may require the UE to be in Active Time during the "Possible DRX" time periods.

FIG. 1 shows both a long DRX cycle and a short DRX cycle, and the UE may be either in short or long DRX cycle at any given time, but not in both. There are specific rules for when the UE shall enter short DRX cycle mode, and when the UE shall enter long DRX cycle mode. Typically, when there is traffic ongoing in the system, the UE will be moved to short DRX cycle mode, and when there has been a time period of inactivity, the UE is moved from the short DRX cycle mode to long DRX cycle mode.

If a UE has been active with receiving or transmitting data in one subframe, it is likely that said UE will be scheduled again in the near future. Therefore, the UE will remain in active state for a configurable time after being scheduled. This is implemented by the UE starting or re-starting a DRX inactivity timer every time it is scheduled, i.e. successfully decodes a PDCCH for a first transmission. When the DRX inactivity timer expires, the UE is moved to short DRX cycle mode. The time during which the UE remains in the short DRX cycle mode is set by the timerdrxShortCycleTimer, which is associated with the short DRX cycle. As long as this timer is running the UE is in short DRX cycle mode. When the drxShortCycleTimer expires the UE is moved to long DRX cycle mode. The long DRX cycle is always a multiple of the short DRX cycle, so that the onDuration time period of the long DRX cycle will always coincide with the onDuration time period of one of the short DRX cycles. The number of short DRX cycles that will be needed to fill up one long DRX cycle is configured by the network. Note that the usage of the short DRX cycle is optional and if not configured by the network, the UE will always be in long DRX cycle mode, provided that the DRX function has been configured for the UE.

The purpose of having these two different cycles is to provide flexibility such that the UE is allowed to be more responsive by using short DRX cycle and to allow the UE to save battery by using long DRX cycle dependent on the current data rate of the UE and the current traffic load in the system.

MAC Control Elements

According to the LTE MAC specification 3GPP TS 36.321, layer 2 specific control information is provided in MAC Packet Data Units, PDUs, by including MAC control elements. A MAC control element is identified with a specific Logical Channel Identity, LCID, where a specific LCID value identifies a unique MAC control element. For downlink the reserved value range for available LCIDs to be used for identifying MAC control elements is 11 to 26, and for uplink the value range is 11 to 24. Hence, the LCID values that are available for new MAC control elements is a limited resource and it is important to not allocate these number if not absolutely needed.

The DRX Command MAC control element is used to order the UE to leave Active Time, during which time the UE is required to monitor PDCCH, and go to DRX inactivity, during which the UE is not required to monitor the PDCCH, and to use the short DRX cycle. Such DRX commands may be sent by the network, i.e. the eNB in LTE, when the network knows that the UE will not be scheduled in the near future, or when the likelihood that the UE will be scheduled in the near future is low. This case can for example occur after a handover of the UE when the UE is not reporting any data to transmit and there is no data in the downlink buffer in the eNB, then it is likely that the UE has no ongoing traffic. This means that a UE that is in Active Time will leave Active Time upon reception of the MAC control element and remain in a period of inactivity, DRX inactivity, until it is moved back into Active Time again. This may for example be due to the UE entering the onDuration period of the DRX cycle, or if the UE has data to transmit and sends a scheduling request to the network. It should be noted that if the UE is in long DRX cycle when receiving this MAC control element, the UE will be moved to short DRX cycle.

The DRX Command MAC control element is specified with a MAC subheader as illustrated in FIG. 2.

The LCID for this MAC control element is currently set to 11110 in binary format. There are two reserved bits (specified with 'R') currently set to 0, and one extension field which is set to 1 if more fields are present in the MAC header, and set to 0 if either a MAC SDU (Service Data Unit), a MAC control element or padding starts at the next byte (specified with 'E').

SUMMARY

In order to save battery in the UE, it would be desirable to provide the possibility to order the UE to go directly to long DRX cycle mode without having to wait for the drxShortCycleTimer to expire in situations when the network can assume that the UE has no ongoing traffic.

The purpose of embodiments herein is therefore to provide methods in which a UE may be moved directly to long DRX cycle. With the presented embodiments the UE may directly change to DRX inactivity upon reception of a DRX command MAC control element, in the same way as is done with the existing DRX command MAC control element, but with the difference that the UE is moved to long DRX cycle instead of short DRX cycle, and the drxShortCycleTimer is stopped if it is running.

One method to move a UE directly to long DRX cycle would be to introduce a new MAC control element to achieve this function. Such new MAC element would be allocated a new LCID value and have the same behavior as the existing DRX command MAC control element, but with the difference that the UE is moved to long DRX cycle instead of short DRX cycle, and the drxShortCycleTimer is stopped if it is running.

However, adding a new MAC control element would mean that an additional LCID value must be allocated, and also a legacy UE will not be able to receive the MAC control element without triggering an error when decoding the MAC PDU. Therefore, embodiments herein provide methods to reuse the existing DRX command MAC control element for the new purpose of moving the UE to long DRX cycle instead of short DRX cycle.

A first aspect relates to a method in a network node for controlling DRX to be applied by a user equipment connected to said network node, wherein said network node can order the UE to enter a first DRX cycle by means of a specific control element. Said method comprises the step of ordering the user equipment to enter a second DRX cycle by means of a modified usage of said specific control element.

In some embodiments, said modified usage comprises the step of including the specific control element more than one time within the same MAC PDU. In another embodiment, said modified usage comprises the step of changing a value of a reserved bit comprised in said specific control element.

In some embodiments, the method comprises the step of ordering the UE to stop a timer associated with said first DRX cycle by means of said modified usage.

Said network node may for example be an eNodeB in an LTE system. Said first DRX cycle may be a short DRX cycle and the second DRX cycle may be a long DRX cycle.

A second aspect relates to a network node capable of controlling DRX to be applied by a user equipment connected to said network node, wherein said network node is capable of ordering the UE to enter a first DRX cycle by means of a specific control element. The network node further comprises processing circuitry configured to order the user equipment to enter a second DRX cycle by means of a modified usage of said specific control element.

In some embodiments, the network node further comprises processing circuitry configured to order the UE to stop a timer associated with said first DRX cycle.

A third aspect relates to a method in a user equipment connected to a network node, for applying DRX wherein said user equipment can be ordered by the network node to enter a first DRX cycle by reception of a specific control element. The method comprises the steps of receiving, from the network node, said specific control element, and detecting that the usage of said control element being modified; and interpreting said modified usage of said specific control element as an order to enter a second DRX cycle.

In some embodiments, detecting that the usage of said control element being modified comprises detecting that the specific control element is included more than one time within the same MAC PDU. In other embodiments, detecting that the usage of said control element being modified comprises detecting a changed value of a reserved bit comprised in said specific control element.

In some embodiments, the method comprises the step of interpreting said modified usage of said specific control element as an order to stop a timer associated with said first DRX cycle.

A fourth aspect relates to a user equipment, connectable to a network node and capable of applying DRX. Said user equipment is capable of receiving order by the network node to enter a first DRX cycle by reception of a specific control element. The user equipment further comprises processing circuitry configured to receive, from the network node, said specific control element, and detecting that the usage of said control element being modified; and interpret said modified usage of said specific control element as an order to enter a second DRX cycle.

In some embodiments, the user equipment comprises processing circuitry configured to interpret said modified usage of said specific control element as an order to stop a timer associated with said first DRX cycle.

For example, when using an existing control element such as the existing DRX command MAC control element in a new way to mean that a UE should move to long DRX cycle instead of short DRX cycle, this means that a legacy UE will be able to receive this new variation of an existing MAC control element without triggering an error. A legacy UE will interpret this new variation of the DRX command MAC control element as if it would have its current meaning, and hence a legacy UE would go to short DRX cycle when receiving this variation of the DRX command MAC control element. Also, since the short DRX cycle is aligned with the long DRX cycle, the legacy UE will be in Active Time in all cases when it would be in Active Time if in long DRX cycle. This means that from the network point of view the UE has either moved to short DRX cycle or to long DRX cycle, and if the network assumes that the UE has moved to long DRX cycle the network will always be able to scheduled the UE in the OnDuration period of the long DRX cycle, because this is also an OnDuration period of the short DRX cycle.

According to the embodiments presented herein, the network can move the UE directly to long DRX cycle in order to minimize the battery usage by the UE.

Other objects, advantages and novel features of the invention will become apparent from the following detailed description of the invention when considered in conjunction with the accompanying drawings and claims.

DETAILED DESCRIPTION

The invention will hereinafter be described in more detail with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description. For purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The present invention can be exemplified in the following non-limiting description of embodiments of the invention, with terminology from LTE.

Figure 1:
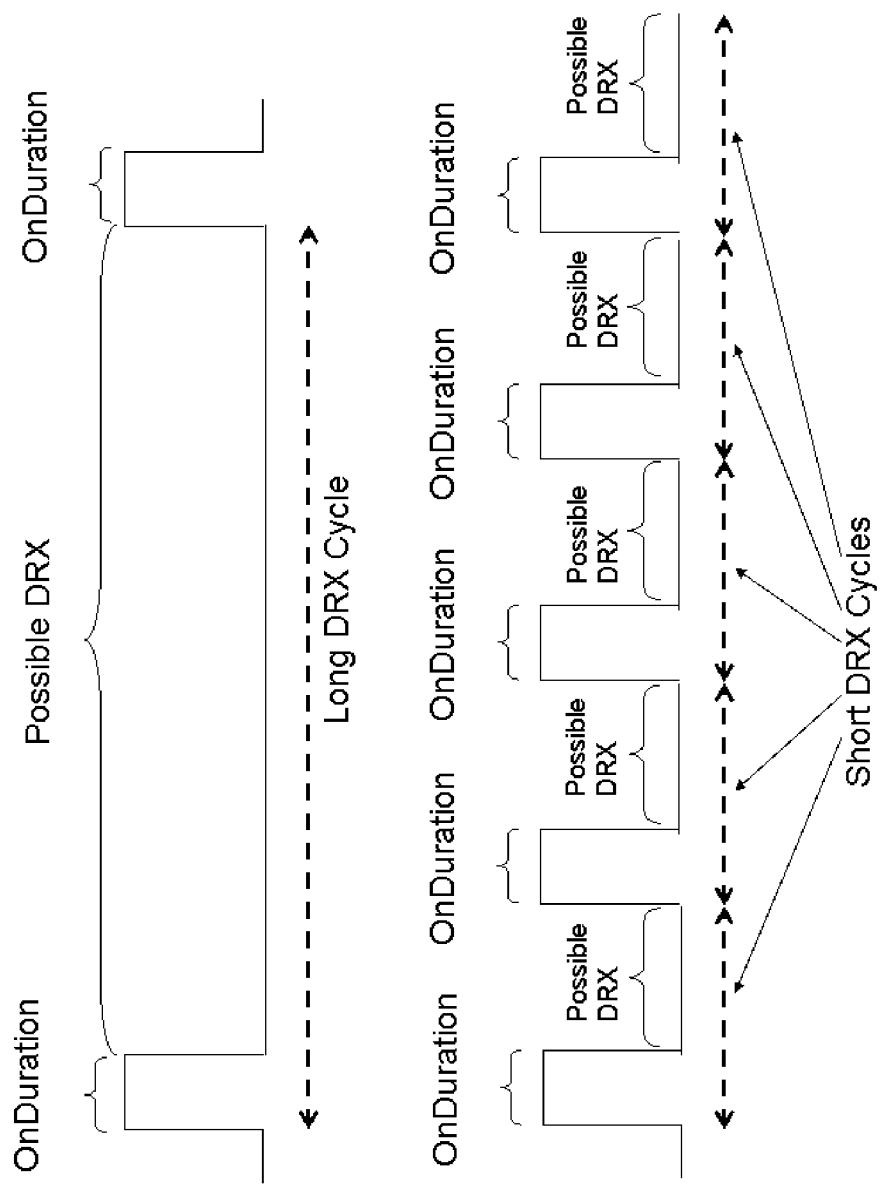
FIG. 1 illustrates long and short DRX cycles.
Figure 2:
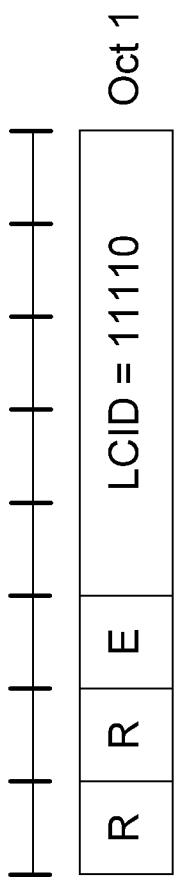
FIG. 2 illustrates a DRX Command MAC subheader.
Figure 3:
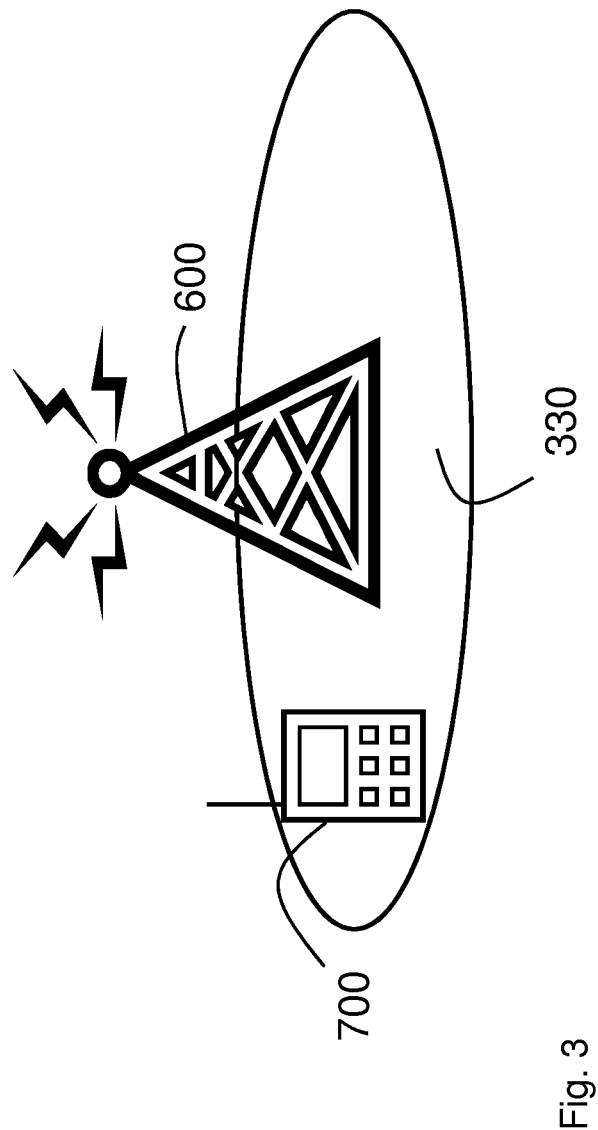
FIG. 3 illustrates a base station in connection with a user equipment.

With reference to an exemplary scenario in FIG. 3, consider a UE 700 in connected mode, i.e. in RRC_CONNECTED state. The UE is connected to a network node 600, such as a radio base station, in LTE terminology referred to as an eNodeB. The eNodeB provides radio coverage to one or more cells 330. The UE may for example be in Active Time, for example in an onDuration period of a first DRX cycle mode or in non-DRX mode, alternatively the UE may be in a DRX inactivity period of a first DRX cycle mode. Said first DRX cycle mode may be a short DRX cycle mode. If the eNB determines that it is likely that the UE would benefit from entering a second DRX cycle mode, such as a long DRX cycle mode, it may order the UE to do so by applying any of the embodiments that will be described in the following. For example, the eNB may determine that the UE will likely not be scheduled in the near future, and in order to allow the UE to save battery, it may order the UE to enter a long DRX cycle mode.

Figure 4:
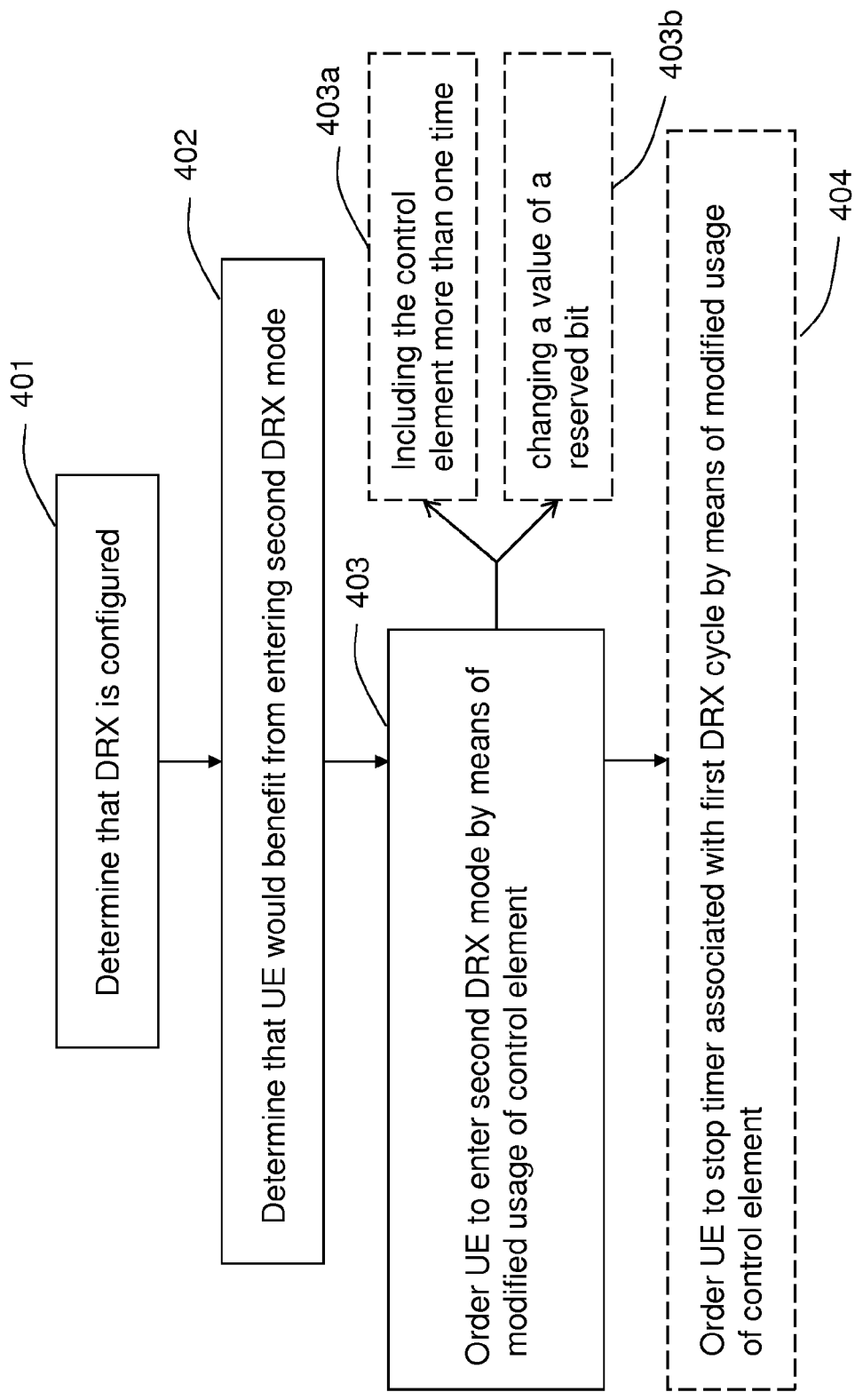
FIG. 4 illustrates a flow chart of an embodiment performed by a network node.

With reference to FIG. 4, an example embodiment of a method performed by a network node is described. In step 401, the eNB determines that DRX is configured in a UE. If so, the eNB may determine, in step 402, that the UE would benefit from entering a second DRX cycle mode, for example for battery saving reasons. In step 403, the eNB orders the UE to enter the second DRX cycle mode by means of a modified usage of a DRX Command MAC Control Element that with non-modified usage instead would order the UE to enter a first DRX cycle mode. Said modified usage may in some embodiments comprise the step 403a of including the specific control element more than one time within the same MAC PDU. In other embodiments, said modified usage comprises the step 403b of changing a value of a reserved bit comprised in said specific control element. In an optional step 404, the eNB may order the UE to stop a timer associated with said first DRX cycle, for example by means of said modified usage of the specific control element.

Figure 5:
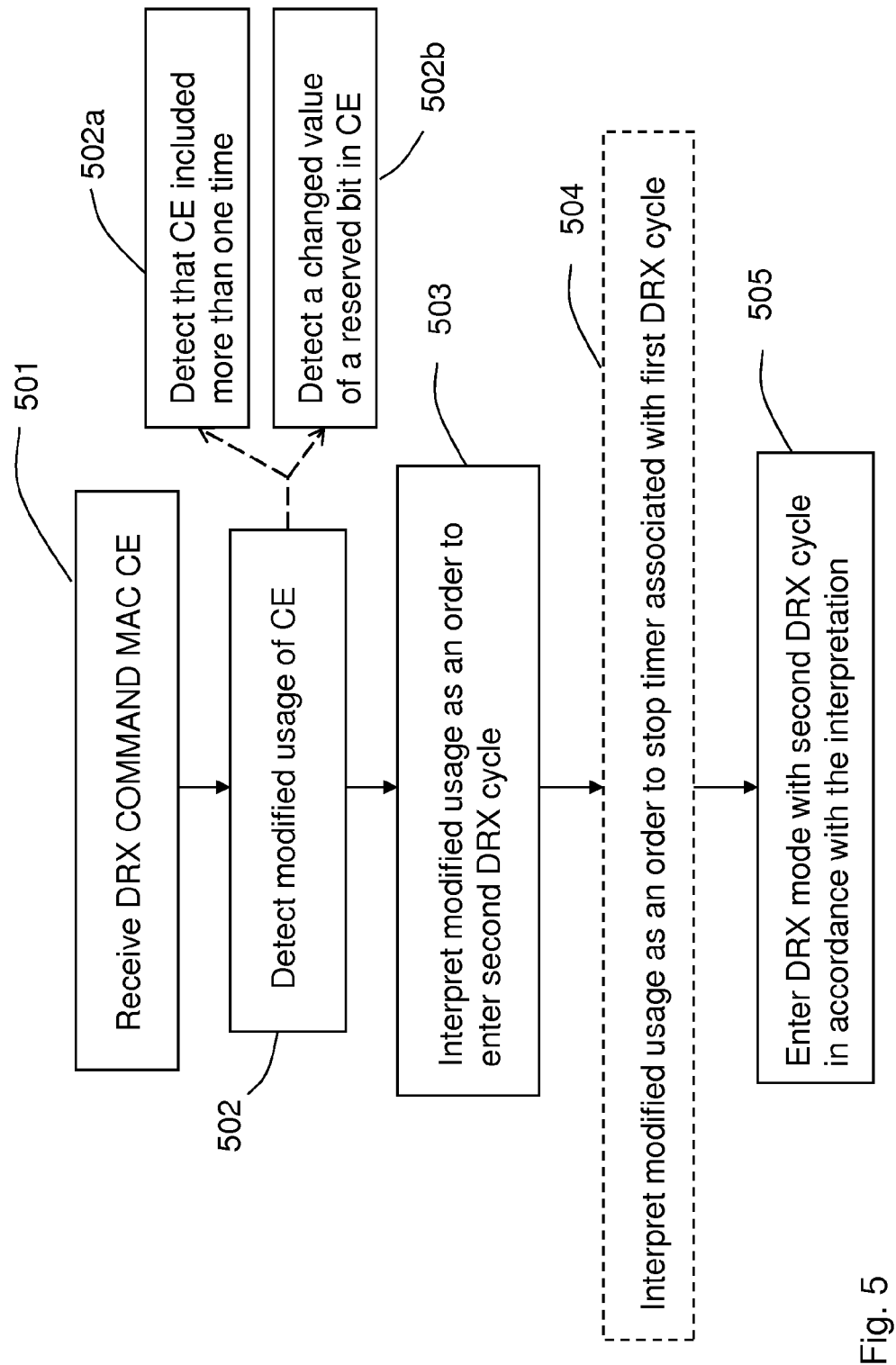
FIG. 5 illustrates a flow chart of an embodiment performed by a user equipment.

With reference to FIG. 5, an example embodiment of a method performed by a user equipment is described. In step

501, the UE receives a DRX Command MAC Control Element, from the network node. If the usage of said control element is non-modified, the UE will follow a normal procedure which means entering DRX inactivity mode and using a first DRX cycle. However, if the UE detects that the usage of the control element has been modified by the network node, as indicated by step 502, the UE will interpret this modified usage as an order to enter a second DRX cycle mode, see step 503. In some embodiments, detecting that the usage of said control element being modified comprises detecting that the specific control element is included more than one time within the same MAC PDU, 502*a*. In other embodiments, detecting that the usage of said control element being modified comprises detecting a changed value of a reserved bit comprised in said specific control element 502*b*.

In some embodiments, the modified usage is interpreted by the UE as an order to stop a timer associated with said first DRX cycle if said timer is running at the point in time when the specific control element is received, see step 504. Said timer may be the drxShortCycleTimer described in the background section. In step 505, the UE will enter the second DRX cycle in accordance with the interpretation of the modified usage of the received control element.

According to some embodiments, the first DRX cycle corresponds to a short DRX cycle and the second DRX cycle corresponds to a long DRX cycle, but other constellations may be equally applicable.

According to one exemplary embodiment, said modified usage referred to in the method steps described with reference to FIGS. 4 and 5 comprises the step of including the specific control element more than one time within the same MAC PDU. Thus, in this embodiment the existing DRX command MAC control element is used in a new, modified, way by including it at least two times within the same MAC PDU, and with this new usage it has the same behavior as the existing DRX command MAC control element used in a non-modified way, but with the difference that the UE will interpret this modified usage as an order to move to a second DRX cycle, e.g. a long DRX cycle, instead of first DRX cycle, e.g. a short DRX cycle.

According to another exemplary embodiment, said modified usage referred to in the method steps described with reference to FIGS. 3 and 4 comprises changing a value of a reserved bit comprised in said specific control element. In this second embodiment the usage of the existing DRX command MAC control element is modified to be used in a new way by using one of the two reserved bits and set it for example to 1 instead of 0, and with this new, modified, usage it has the same behavior as the existing DRX command MAC control element used in a non-modified way, but with the difference that the UE will interpret this modified usage as an order to move to a second DRX cycle, e.g. a long DRX cycle.

According to some embodiments, the modified usage referred to in the method steps described with reference to FIGS. 4 and 5 is interpreted by the UE as an order to stop a timer associated with said first DRX cycle if said timer is running at the point in time when the specific control element is received. Said timer may be a drxShortCycleTimer, the function of which has been described in the background section of this application. The stopping of this timer upon detection of modified usage of the DRX command MAC Control Element means that the UE will leave the first DRX cycle mode and go to the second DRX cycle mode.

Figure 6:
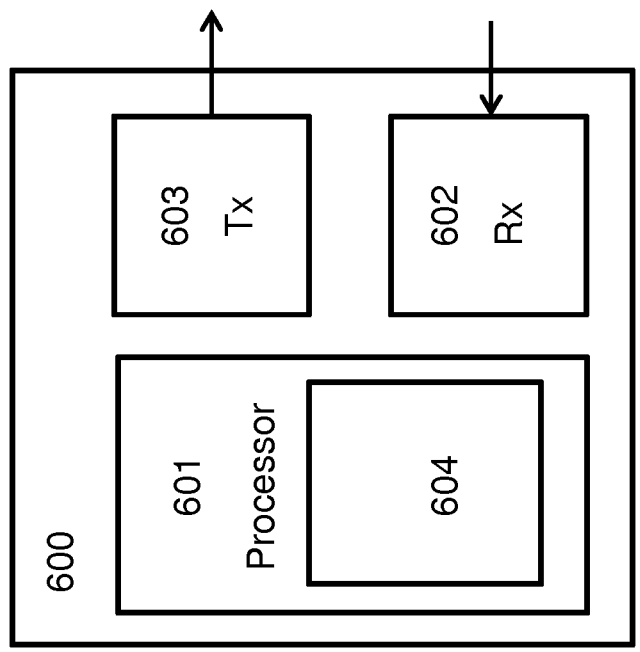
FIG. 6 illustrates schematically a network node capable of carrying out embodiments of the invention.

FIG. 6 schematically illustrates an example embodiment of a network node 600 capable of performing the method described in relation to FIG. 4. The network node is adapted to be comprised in a network and is furthermore adapted for controlling DRX to be applied by a user equipment 700 connected to said network node.

The network node 600 comprises a communication interface comprising a receiver 602 and a transmitter 603 for communicating with the user equipment 700. The network node furthermore comprises a processor 601 comprising processing circuitry 604 configured to order a user equipment to enter a first DRX cycle by means of a specific control element and to enter a second DRX cycle instead of the first DRX cycle by means of a modified usage of said specific control element.

Said network node 600 may for example be an eNodeB for use in an LTE system.

The network node may in a specific embodiment comprise processing circuitry 604 configured to order the UE to stop a timer associated with said first DRX cycle.

Figure 7:
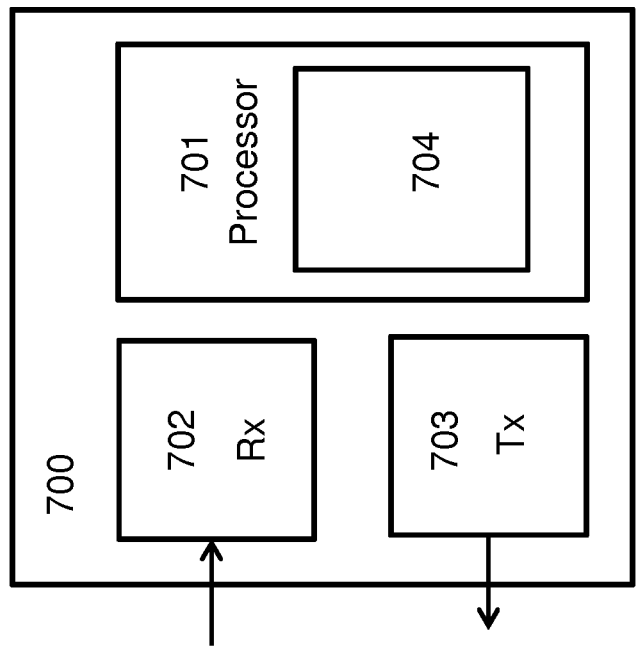
FIG. 7 illustrates schematically a user equipment capable of carrying out embodiments of the invention

FIG. 7 schematically illustrates an example embodiment of a user equipment 700 that is connectable to a network node 600 and capable of applying DRX. The user equipment comprises a communication interface comprising a receiver 702 and a transmitter 703 for communicating with the radio network node. The user equipment 700 furthermore comprises a processor 701 comprising processing circuitry 704 configured to receive, from a network node, a specific control element, ordering the user equipment to enter a first DRX cycle, and to receive said specific control element, the usage of which being modified. The processing circuitry is furthermore configured to interpret said modified usage of the specific control element as an order to enter a second DRX cycle.

The user equipment may in a specific embodiment comprise processing circuitry configured to interpret said modified usage of said specific control element as an order to stop a timer associated with said first DRX cycle.

The method actions performed by the user equipment and the network node are performed by functional elements of the processing circuitry. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband processing circuitry for mobile devices and wireless base stations are well known and are unnecessary to a full understanding of embodiments herein, additional details are not shown here. Program code is stored in a memory that may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The exemplary embodiments described in the foregoing specify new behavior for the existing DRX command MAC control element, which will move the UE directly to long DRX cycle. Some advantages of reusing this existing MAC control element instead of adding a new MAC control element are:

No need to allocate a new LCID for specifying a new MAC control element.

A legacy UE can handle new variations of the DRX command MAC control element without problems and therefore the eNB can avoid having different handling for UEs adapted for different releases.

The present invention may, of course, be carried out in other ways than those specifically set forth herein without departing from essential characteristics of the invention. The present embodiments are to be considered in all respects as illustrative and not restrictive.

ABBREVIATIONS

DL Downlink
DRX Discontinuous Reception
3GPP 3$^{rd}$ Generation Partnership Project
LTE Long Term Evolution
LCID Logical Channel Identity
MAC Medium Access Control
RRC Radio Resource Control
UE User Equipment
PDCCH Physical Downlink Control Channel
PDSCH Physical Downlink Shared Channel
PUCCH Physical Uplink Control Channel
PUSCH Physical Uplink Shared Channel
eNB evolved Node-B
PHICH Physical HARQ Indicator Channel
CE Control Element
UL Uplink

The invention claimed is:

1. A method in a network node for controlling discontinuous reception to be applied by a user equipment, wherein the network node is configured to order the user equipment to enter a first discontinuous reception cycle by sending a control element comprising a specific control element value to the user equipment, the method comprising:
ordering the user equipment to enter a second discontinuous reception cycle by modifying the sending of the control element, wherein the modified sending comprises sending the same specific control element value multiple times in the same packet data unit.

2. The method according to claim 1, wherein the packet data unit is a medium access control (MAC) packet data unit and the control element is a MAC control element.

3. The method according to claim 1, comprising the step of ordering the user equipment to stop a timer associated with the first discontinuous reception cycle by the modified sending.

4. The method according to claim 1, wherein the first discontinuous reception cycle is a short discontinuous reception cycle and the second discontinuous reception cycle is a long discontinuous reception cycle.

5. The method according to claim 1, wherein the network node is an eNodeB for use in an Long Term Evolution system.

6. The method of claim 1, wherein the specific control element value is a Logical Channel Identity (LCID) value.

7. A network node capable of controlling discontinuous reception to be applied by a user equipment, wherein the network node comprises a processor and a memory, the memory containing instructions executable by the processor whereby the network node is configured to:
order the user equipment to enter a first discontinuous reception cycle by sending a control element in a packet data unit comprising a specific control element value; and
order the user equipment to enter a second discontinuous reception cycle by including the same specific control element value multiple times within the packet data unit.

8. The network node according to claim 7, wherein the packet data unit is a medium access control packet data unit.

9. The network node according to claim 7, wherein the memory contains instructions executable by the processor whereby the network node is configured to order the user equipment to stop a timer associated with the first discontinuous reception cycle.

10. The network node according to claim 7, wherein the first discontinuous reception cycle is a short discontinuous reception cycle and the second discontinuous reception cycle is a long discontinuous reception cycle.

11. The network node according to claim 7, wherein the network node is an eNodeB for use in an Long Term Evolution system.

12. The network node of claim 7, wherein the network node is configured to:
move a first user equipment to enter the first discontinuous reception cycle by sending the specific control element value multiple times in a first packet data unit; and
move a second user equipment to enter the second discontinuous reception cycle by sending the specific control element value multiple times in a second packet data unit,
wherein both the first user equipment and the second user equipment are configured to enter the first discontinuous reception cycle if the network node sends the specific control element value only one time in a packet data unit.

13. A method in a user equipment for applying discontinuous reception wherein the user equipment is configured to enter a first discontinuous reception cycle responsive to reception of a control element comprising a specific control element value from a network node, the method comprising:
receiving, from the network node, the specific control element value, and detecting that the specific control element value is included multiple times within a packet data unit; and
responsive to the detecting, entering a second discontinuous reception cycle.

14. The method according to claim 13, wherein the packet data unit is a medium access control packet data unit.

15. The method according to claim 13, comprising stopping a timer associated with the first discontinuous reception cycle responsive to the detecting.

16. The method according to claim 13, wherein the first discontinuous reception cycle is a short discontinuous reception cycle and the second discontinuous reception cycle is a long discontinuous reception cycle.

17. The method of claim 13, wherein the specific control element value is a Logical Channel Identity (LCID) value.

18. A user equipment configured to apply discontinuous reception, the user equipment comprises a processor and memory, the memory containing instructions executable by the processor whereby the user equipment is configured to:
enter a first discontinuous reception cycle responsive to reception of a control element comprising a specific control element value from a network node;

receive, from the network node, the specific control element value;
detect that the specific control element value has been included multiple times in a packet data unit; and
responsive to detecting that the specific control element value has been included multiple times in a packet data unit enter a second discontinuous reception cycle.

19. The user equipment according to claim 18, wherein the packet data unit is a medium access control packet data unit.

20. The user equipment according to claim 18, wherein the memory contains instructions executable by the processor whereby the user equipment is configured to stop a timer associated with the first discontinuous reception cycle responsive to detecting that the specific control element value has been included multiple times in the packet data unit.

21. The user equipment according to claim 18, wherein the first discontinuous reception cycle is a short discontinuous reception cycle and the second discontinuous reception cycle is a long discontinuous reception cycle.

22. The user equipment of claim 18, wherein the memory contains instructions executable by the processor whereby the user equipment is configured to:
detect that the specific control element value has been included only one time in a packet data unit; and
enter the first discontinuous reception cycle responsive to reception of a specific control element value from the network node and detecting that the specific control element value has been included only one time in a packet data unit.

* * * * *